United States Patent [19]

Sellmaier et al.

[11] 4,444,172
[45] Apr. 24, 1984

[54] INTERNAL COMBUSTION ENGINE KNOCK SENSING SYSTEM

[75] Inventors: Franz Sellmaier, Schwieberdingen; Bernward Böning, Ludwigsburg; Rudolf Nagel, Asperg; Rainer Bone, Vaihingen, all of Fed. Rep. of Germany

[73] Assignee: Robert Bosch GmbH, Stuttgart, Fed. Rep. of Germany

[21] Appl. No.: 389,586

[22] Filed: Jun. 18, 1982

[30] Foreign Application Priority Data

Jul. 18, 1981 [DE] Fed. Rep. of Germany ....... 3128554

[51] Int. Cl.³ .................... G01M 15/00; F02P 5/14; F02D 9/00
[52] U.S. Cl. .................... 123/425; 123/435
[58] Field of Search .......... 123/425, 435, 419, 436, 123/418, 422; 73/35

[56] References Cited

U.S. PATENT DOCUMENTS

| | | | |
|---|---|---|---|
| 4,232,545 | 11/1980 | Dobler et al. | 123/435 |
| 4,240,388 | 12/1980 | Omori et al. | 123/435 |
| 4,304,353 | 12/1982 | Fiala | 123/425 |
| 4,327,688 | 5/1982 | Lowther | 123/425 |
| 4,343,278 | 8/1982 | Asano | 123/435 |
| 4,344,400 | 8/1982 | Asano | 123/435 |
| 4,354,378 | 10/1982 | Oshiage et al. | 123/425 |
| 4,366,792 | 1/1983 | Deleris | 123/425 |
| 4,385,607 | 5/1983 | Honiden et al. | 123/425 |

Primary Examiner—Raymond A. Nelli
Attorney, Agent, or Firm—Frishauf, Holtz, Goodman & Woodward

[57] ABSTRACT

In order to eliminate from an ion current sensor signals which are not derived from knocking of an engine, the ion current sensor signal is evaluated by a high-pass - low-pass filter to filter out signals of frequencies extraneous to knocking frequencies, using, preferably, a digital filter including two timing stages (11, 13) connected to a counter; to inhibit response of the circuit, an interrupter switch (8) is included in the evaluation circuit, which is opened upon sensing of disturbance signals due to ignition events, for example upon occurrence of ignition, by setting a timing stage (20) which maintains the switch open, and thus inhibits evaluation of oscillatory signals from the ion current sensor (1) for the timing duration thereof. To store previously counted oscillatory signals, a further timing stage (21) can be provided, likewise connected to the ignition signal and enabled at the initiation of current flow through the primary of an ignition coil to prevent resetting of the counter for the timing duration thereof.

16 Claims, 1 Drawing Figure

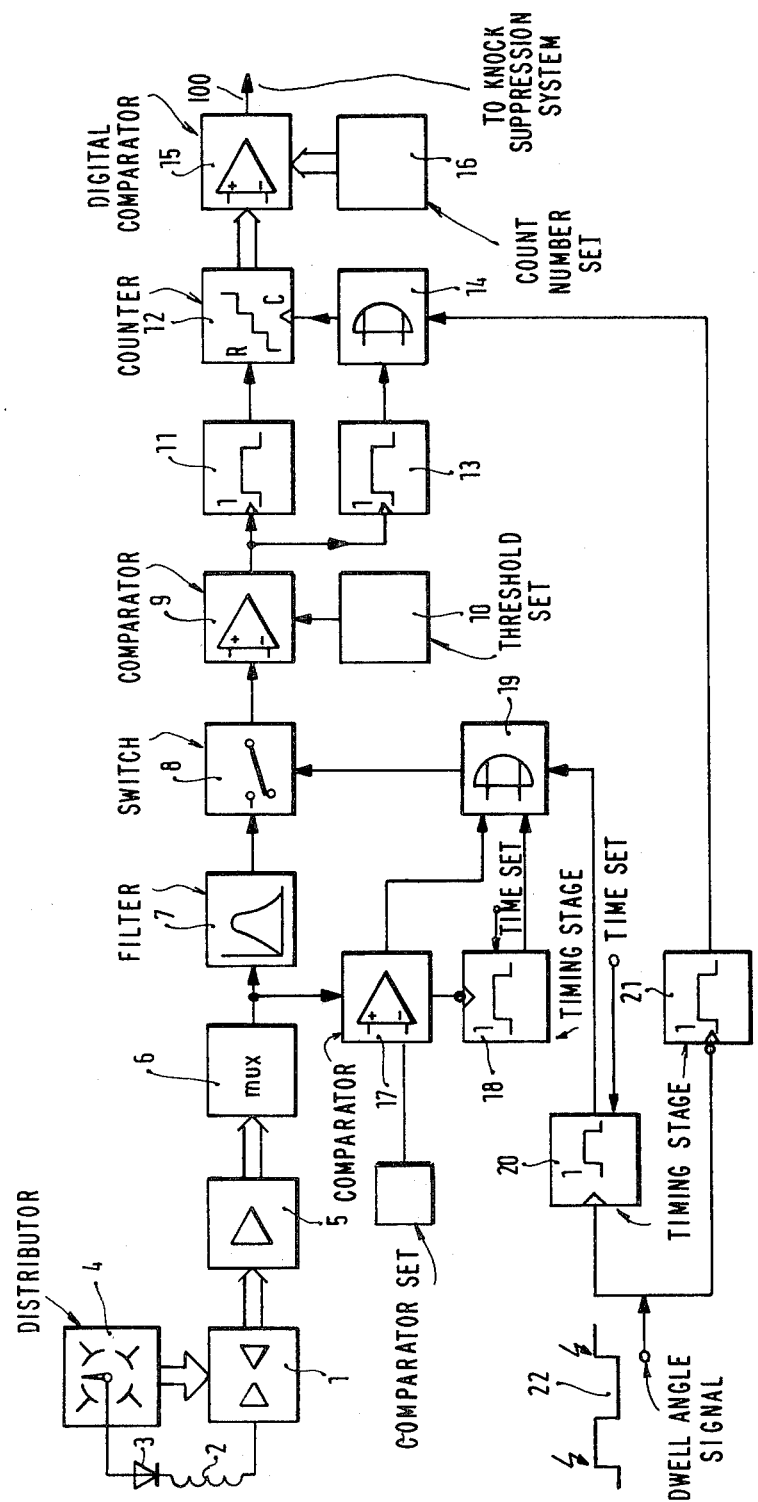

INTERNAL COMBUSTION ENGINE KNOCK SENSING SYSTEM

The present invention relates to internal combustion engines, and more particularly to a system to sense knocking or incipient knocking, or pinging of the engine.

BACKGROUND

Knocking of internal combustion engines may occur under certain operating conditions. Knocking, as well known, is considered to result from pressure waves or pulses of the fuel-air mixtures which can be heard as oscillations of the engine. Knocking causes high thermal loading of the walls of the cylinder and of the piston, which may also cause removal of material therefrom, and damage to the engine. It is, therefore, desirable that knocking be avoided. Continued operation of the engine under knocking conditions may lead to destruction thereof. The working range of the engine should be utilized as efficiently as possible, however, and it is thus desirable to operate the engine as close to the knocking limit as possible without, however, permitting knocking actually to occur. It is, therefore, desirable to be able to determine knocking or incipient knocking as quickly and as early as possible.

Various types of systems have been proposed to determine incipient occurrence of knocking in the combustion chamber of an internal combustion (IC) engine. It has been proposed to include an ion current measuring path within the combustion chamber of the IC engine in order to determine, and sense, pressure variations occurring in the combustion chamber—see, for example, German Patent Disclosure Document DE-OS No. 28 02 202. This system utilizes an evaluation circuit in which the ion current is transformed into a control signal which can be processed in a control system.

It has also been proposed to generate a control signal which is applied to a demodulator circuit. Such a system is described, for example, in German Patent Disclosure Document DE-OS No. 29 18 420, in which the knocking sensor generates a signal which includes background noise signals as well as signals representative of knocking oscillations. This signal, after demodulation in the demodulator circuit, is applied to two branches. One is the background noise branch, and one is the knock signal branch. The signals are applied to a comparator. The background noise signal is generated by a low-pass filter. The background noise signal, after filtering, is compared with the knocking signal in the comparator, which then provides a "yes/no" output, representative of whether knocking occurred, or not. A transducer is used which senses oxcillations of the IC engine. The evaluation circuit for the type of transducer there disclosed cannot be used directly to evaluate signals derived by sensing ion current variations.

THE INVENTION

It is an object to provide an evaluation circuit for use in combination with an ion current sensor which permits elimination of signals from the ion current sensor which might, erroneously, be recognized as knock signals, but which occur under normal engine operating conditions, so that the ion current signal can be accurately evaluated for knocking, or normal engine operation, respectively.

Briefly, the evaluation circuit includes an interrupter, or switching element connected therein which inhibits further evaluation of the knocking signal as such, upon disturbance signals in the ion current signal being generated, such disturbance signals, otherwise, would be evaluated as normal disturbance signals. Typical disturbance signals are derived, for example, as a consequence of ignition of the IC engine. The evaluation circuit is so arranged that the error or disturbance signals themselves are utilized to inhibit sensing of the signals derived from the sensor unless the signals from the sensor are specific to knocking signals. For example, the evaluation circuit may include filters which recognize the frequencies peculiar to the knocking frequency and eliminate from evaluation signals with higher as well as lower frequency than those which are of knocking frequency.

In accordance with a feature of the invention, signals derived from the ignition system of the engine are utilized to inhibit evaluation of the signals from the ion current knocking sensor to positively exclude signals which are derived from ignition events—a primary source of erroneous signal processing of the output from an ion sensor.

The system has the advantage that the inherently reliable ion current sensor can e used coupled with an evaluation circuit in which the background or erroneous signals which are caused, for example, by ignition events, are excluded from evaluation so that erroneous evaluation of the signals derived from ignition is effectively prevented. Evaluation of the ion current signals then is interrupted or stopped, or otherwise inhibited. This system thus permits dynamic level evaluation, without placing an external fixed measuring window or measuring range with fixed limits on the signal; rather, the disturbance signals are eliminated based on the generation of the disturbances themselves.

DRAWING

The single FIGURE illustrates a circuit for evaluating ion-current knock sensing signals.

A sensor 1 is provided which measures ion currents. This sensor may include an ion current element supplied from a current source 4 over a diode 3 and the secondary 2 of the ignition winding. The ion current sensor 1 may be a special type of spark plug, or a standard customary mass-produced spark plug. The secondary 2 of the ignition coil is separately shown. The diode 3 connects the secondary 2 of the ignition coil to the center terminal of a distributor 4, so that ignition voltage is applied from the ignition coil 2 to the various plugs 1, operating as ion current sensors over the distributor 4. Details of the ten current sensor form part of the published technology—see German Patent Publications DE-OS No. 28 02 202, to which U.S. Pat. No. 4,232,545 corresponds, and DE-OS No. 30 06 665, to which U.S. Pat. No. 4,359,893 corresponds, both assigned to the assignee of this application.

Each one of the cylinders of a multi-cylinder IC engine has its own ion current sensor. The multiple connection from the distributor 4 to the ion current sensors 1 is shown by the wide arrow 4', the connection of the ignition coil 2 being shown only schematically.

The respective sensor plugs 1 are connected to a multiplex circuit 6 via charge amplifiers 5, individual to the respective plugs 1. The output of the multiplex circuit 6 is connected to a filter 7, which has a filter characteristic as shown within the schematic diagram of the filter 7, and then to a switch 8 which, in normal, closed condition, is conductive, that is, in the postion not shown in the drawing. Switch 8 preferably is an electronic switch, and has one input connected to a comparator 9, the other input to which is connected to a threshold setting stage 10. The output of comparator 9 is connected to a first timing switch 11. Timing switch 11 may, for example, be a monostable flip-flop. The output thereof is connected to the reset input of a counter 12. The comparator 9 is further connected to a second timing stage 13, for example likewise a monostable flip-flop (FF), the output of which is connected to one input of an OR-gate 14. The output of OR-gate 14 is connected to the count input C of counter 12. The outputs of the counter 12 are connected to a digital comparator 15. The comparison value of the digital comparator 15, that is, the number at which it provides an output, is controlled by a comparison setting stage 16. The output of the digital comparator 15 provides the knocking recognition signal which can be connected to a knocking control device, for example apparatus to change the spark plug timing of the ignition system in the direction of spark retardation to change the ratio of fuel and air in the fuel-air mixture control system, or the like.

The output of multiplexer 6 is connected to a second comparator 16, the output of which is connected to a third timing circuit or timing stage 18 and, further, to a second OR-gate 19. The third timing circuit 18, or the output of comparator 17, respectively, controls operation of the OR-gate 19 and hence change in switching position of the switch 8. A fourth timing circuit 20 is provided, connected to the ignition system and having the dwell angle signal applied thereto. A representation of the signal is shown at 22 in the FIGURE. The lightning arrows indicate the occurrence of an ignition event, that is, the time at which a breaker contact of the ignition system opens, or, in an electronic ignition system, an electronic switch changes from conductive to non-conductive or blocked condition, that is, the occurrence of a spark at the spark plug. The fourth timing circuit 20 is connected to a further input of the OR-gate 19. The fifth timing circuit 21, likewise connected to the dwell angle signal, has its output connected to the OR-gate 14. The comparison vlaue of comparator 17 is set by a comparator set stage 17a which may be hard-wired into the comparator, in dependence on the type of IC engine with which the system is to be used, in order to introduce a comparison value to comparator 17 related to the ion current due to ignition events.

OPERATION

The ion current signals derived from the ion sensor 1 are determined or evaluated or measured at the cylinder which has just been fired. The amplifier 5, which also acts as an impedance coupling element, supplies these signals to the multiplexing circuit 6. Diode 3 eliminates interference in the ion current signals which are introduced upon closing of the breaker switch, that is, upon beginning of the conduction period of current flow through the primary (not shown) ignition coil 2.

The multiplexing stage/switches the respective sensor, then providing an ion current signal to the filter 7. The multiplexer, thus, acts as a reverse distributor, to apply to the filter 7 the signals derived upon sensing of ion current of the respective cylinder which has just fired. The measuring channels can be reduced, and the multiplexer 6 simplified by combining, for example in a buffer, or an element similar to an OR-gate, the ion currents derived from cylinders in which there is no, or only insignificant overlap, with respect to time. Thus, for example, a four-cylinder engine may require only two measuring channels.

The filter 7 filters out those frequencies in which no knocking oscillations are to be expected.

Let it be first assumed that switch 8 is in conductive state. The ion current signal is then applied to the input of the comparator 9, the threshold value of which is so set with a threshold setting stage 10 that a certain minimum threshold, related to oscillations, will appear as output signals from the comparator, but that low-level oscillations will not. When excessive amplitudes are applied to the comparator 9, representative, for example, possibly of knocking, comparator 9 provides a recognition signal which transforms the oscillations applied to the comparator 9 into output pulses in dependence on the input oscillations exceeding the threshold level set by the threshold setting stage 10. The pulses thus derived from the comparator 9 are applied, in parallel, to the two first and second timing stages 11, 13. The first timing stage 11 has an unstable or timing duration which is somewhat longer than the oscillation period of possible knocking oscillations. The unstable or timing duration of the second timing circuit 13 is somewhat shorter, however. Both of the timing circuits 11, 13 are the so-called re-triggered monostable FFs, that is, if one of the timing circuits is in its unstable state, and a new pulse is applied thereto, it will retain its unstable state condition until its unstable timing period is again terminated, unless, again, a third new pulse is applied to its input. If no such third pulse is applied, the timing circuit reverts to its stable, non-timing state.

Let it be assumed that the ion current signal derived from the sensor 1, and connected through switch 8 to the comparator 9, includes knocking oscillations. The first timing circuit 11 is re-triggered each time by the pulses from the comparator 9, and will retain its unstable state for the duration of the knocking oscillations. At the same time, the pulses are applied over the timing circuit 13 and the OR-gate 14 to the count input of the counter 12, since the unstable time of the timing stage 13 is less than the oscillation duration of the pulses from the comparator 9. Consequently, counter 12 will count the pulses which correspond to the knocking oscillations for the duration of the unstable time of counter 11. The count number is directly connected to the digital comparator 15. If the count number counted by counter exceeds a comparison value set by count number setting stage 16, the digital comparator 15 will provide a "knock recognized" signal, which is applied via the output terminal 100 to a suitable system or device to suppress further knocking, for example a system to retard the ignition spark.

The timing circuits 11, 13 thus act similar to a digital filter. If oscillations in the ion current signal occur having a frequency less than knocking frequency, counter 12 is continuously reset to count state 0, since the timing circuit 11 returns into its stable state before a new trigger impulse is applied to its input. The timing switch 11, thus, acts similar to a high-pass filter. If the frequency of the pulses supplied from the comparator 9 is greater than the knocking frequency, timing circuit 13 will no longer return to its stable state, since it is continuously re-triggered. The counter 12, thus, is inhibited, i.e. it does not count, since no further counting pulses are applied to its counting input C. Timing circuit 13, in combination with the counter 12, thus acts as a low-pass filter. In accordance with a feature of the invention, signals from the sensor 1 are not evaluated or transmitted if the signals cannot be knocking signals. Inhibiting or blocking signals are applied to an OR-gate 19 which opens switch 8 to inhibit transmission of signals which cannot be knocking signals, and which occur during operation of the engine, regardless of whether it knocks, or does not knock.

The fuel-air mixture in the cylinder is ignited as soon as the breaker switch or equivalent semiconductor element of the ignition system opens the circuit through the primary of the ignition coil. High sudden increases in the ion current signal will result which may lead to erroneous results if they would be evaluated. Knocking does not occur immediately after ignition, but shortly thereafter. It is thus possible to eliminate erroneous evaluation by inhibiting analysis of the ion current signal by opening switch 8 upon, and shortly after, occurrence of ignition. The threshold of comparator 17 is so determined by the comparator setting stage 17a that it is less than the amplitude of the ion current signal occurring upon ignition, but higher than the ion current after the ignition spark has occurred. If the threshold of comparator 9 is exceeded, a pulse is applied by its output which, by its trailing flank, sets the third timing stage 18 into its unstable state, where it will be retained for a predetermined period of time. This signal is conducted over the OR-gate 19 to the switch 8 to control the switch into its open or non-conductive state. The counter 12 is reset by the first timing circuit 11 regardless of its prior state.

The holding time of the third timing circuit 18 can be set in dependence on the length of the disturbance signal in the ion current sensor 1 based on ignition. Thus, the disturbance signals which are caused by ignition, themselves, are utilized to suppress the evaluation of the signal from the ion current sensor 1.

Switch 8 can, additionally, be switched independently of the ion current signal. The fourth timing circuit 20 is triggered by the flank of the ignition signal upon termination of the "closed" time, that is, upon occurrence of an ignition event, and brought into its unstable state. During the unstable time of FF 20, switch 8 is reliably held in open condition. The unstable time of timing circuit 20 is controllable.

Upon closing of the primary circuit to the ignition coil, disturbances in ion current may occur which are usually quite effectively suppressed by interposing the high-voltage diode 3 between the ignition coil 2 and the center tap of the distributor 4. The counter 12 is thus held in its count position during the disturbance. The fifth timing circuit 21 thus maintains the counter 12 over the OR-gate 14 in counting position until the timing circuit 21 resets into its stable state.

Various changes and modifications may be made; for example, as shown, switch 8 is connected between filter 7 and comparator 19. Switch 8 may be connected, however, at any suitable position. It may be placed anywhere in the branch between the multiplex circuits 6 and the counter 12, for example can be connected directly to the reset input of the counter 12, or to the output of the comparator 9. Various other changes and modifications may be made within the scope of the inventive concept.

We claim:

1. In combination with an internal combustion engine,
a knock sensing system having
an ion current sensor (1) located in a combustion chamber of the engine and providing an ion current signal upon sensing occurrence of combustion in the chamber;
means (2, 3, 4) supplying an energizing voltage to the ion current sensor;
an evaluation circuit means connected to the ion current sensor for evaluating and analyzing the ion current supplied by the sensor,
and comprising
means coupled to the internal combustion engine responsive to engine operation which results in disturbance signals in the current sensor, for providing disturbance control output signals;
and interruption means connected in said evaluation circuit means inhibiting analysis and evaluation in said evaluation circuit means of the signals from the sensor upon sensing of disturbance signals in the ion current signal.

2. System according to claim 1, wherein the evaluation circuit means includes
a first comparator (9) comparing the ion current signal with a predetermined threshold (10);
and a counter (12) counting the pulses derived from the comparator (9) if oscillations in the ion current signals exceed the comparison level of said first comparator.

3. System according to claim 2, wherein the disturbance signal providing means includes means (21) inhibiting counting of the counter upon occurrence of disturbance signals, said counter forming thereby the interruption means.

4. System according to claim 2, further including a first timing stage (11) connected between the first comparator (9) and a reset input of the counter (12), said first timing circuit having a timing duration somewhat longer than the oscillating period of knocking oscillations.

5. System according to claim 2, further including a second timing stage (12) connected between the comparator (9) and the counting input (C) of the first counter, the timing period of the second timing circuit being slightly less than the oscillating period of the knocking oscillations.

6. System according to claim 4, wherein said first timing stage comprises a re-triggerable circuit.

7. System according to claim 5, wherein said second timing stage comprises a re-triggerable circuit.

8. System according to claim 3, further including first and second timing stages (11, 13) connected to the output of said first comparator, and, respectively, to the reset (R) and count (C) inputs of the counter, the first timing stage having a longer timing interval than the oscillation period of the knocking oscillations, and the second timing stage (13) having a timing period slightly shorter than the oscillation periods of the knocking oscillations to form, in combination with said counter, a digital high-pass and low-pass filter to cause the counter to count only those oscillations which are within the frequency range of oscillation periods of knocking oscillations.

9. System according to claim 3, further including a digital comparator (15) connected to the output of the first counter (12) and providing a knocking indication signal if said counter counts to a predetermined count value.

10. System according to claim 8, further including a digital comparator (15) connected to the output of the first counter (12) and providing a knocking indication signal if said counter counts to a predetermined count value.

11. System according to claim 1, wherein the disturbance signal providing means includes a second comparator (17) connected to receive the ion current signals, and compare the level of said ion current signals with respect to a signal level reference (17a), said second comparator being connected to and controlling said interruption means (8) if the signals from the sensor (1) exceed a predetermined comparison level.

12. System according to claim 11, further including a third timing stage (18) connected to the output of said second comparator and establishing a timing interval if the second comparator determines that the level of the signals from the ion current sensor have exceeded said comparison value, the output of said third timing stage being connected to control opening of said interrupter means (8) and thereby inhibit analysis and evaluation of the signal from the sensor in the evaluation circuit means.

13. System according to claim 1, wherein the disturbance signal providing means includes a fourth timing circuit (20) connected to and controlled by ignition signals occurring in the internal combustion engine and establishing a timing interval upon occurrence of an ignition event;

said fourth timing circuit being connected to control said interruption means (8) to inhibit analysis and evaluation of the signal from the sensor in said evaluation circuit means for a fourth predetermined timing interval immediately subsequent to occurrence of an ignition event.

14. System according to claim 3, wherein the disturbance signal providing means further includes a fifth timing stage (21) connected to and controlled by an ignition signal occurring upon closing of an ignition breaker circuit to the internal combustion engine, the output of said timing stage being connected to athe count input of said counter (12) and holding the counter in its then occurring count state for the duration of a fifth timing interval.

15. System according to claim 14, further including a digitial comparator (15) connected to the output of the first counter (12) and providing a knocking indication signal if said counter counts to a predetermined count value.

16. System according to claim 1, wherein the energizing voltage supply means includes a connection from the secondary of an ignition coil of the internal combustion engine and the center tap of the ignition distributor, and a high-voltage diode connected between said center tap and the secondary and poled to suppress voltage pulses to the ion current sensor occurring upon closing of a breaker switch in the primary of the ignition coil.

* * * * *